April 26, 1966     R. W. SONNENFELDT     3,248,726
NON-LINEAR ANALOG TO DIGITAL CONVERTER
Filed May 24, 1962     2 Sheets-Sheet 1

| TRANSDUCER VOLTAGE | PROCESS VARIABLE | |
|---|---|---|
| 1 | 5 | 0000101 |
| 2 | 10 | 0001010 |
| 3 | 14 | 0001110 |
| 4 | 17 | 0010001 |
| 5 | 20 | 0010100 |
| 6 | 23 | 0010111 |
| 7 | 26 | 0011010 |
| 8 | 30 | 0011110 |
| 9 | 35 | 0100011 |
| 10 | 40 | 0101000 |
| 11 | 45 | 0101101 |
| 12 | 50 | 0110010 |
| 13 | 57 | 0111001 |
| 14 | 80 | 1011010 |
| 15 | 95 | 1011111 |

INVENTOR
RICHARD W. SONNENFELDT
BY *[signature]*
ATTORNEY

INVENTOR.
RICHARD W. SONNENFELDT
BY
Attorney

United States Patent Office 3,248,726
Patented Apr. 26, 1966

3,248,726
NON-LINEAR ANALOG TO DIGITAL CONVERTER
Richard W. Sonnenfeldt, Waban, Mass., assignor to Radio Corporation of America, a corporation of Delaware
Filed May 24, 1962, Ser. No. 197,297
9 Claims. (Cl. 340—347)

The present invention relates to digital data processing. More particularly, the invention is concerned with the problem of converting an analog quantity which represents a variable which may be non-linearly related to the analog quantity, to a form which can be handled conveniently by a digital computer.

Computers designed to control industrial processes commonly are required to handle input analog quantities, such as voltages, which bear a non-linear relationship to a process variable which they measure. As one example, thermocouple voltages bear a non-linear relationship to the temperature they measure. As another example, the height of a fluid in a container of non-uniform cross-section bears a non-linear relationship to the volume of the fluid in the container. It may be expensive and/or time consuming to "linearize" these analog quantities, that is, to translate these analog quantities to ones which are linearly related to the process variable being measured. Nevertheless, such a step is normally necessary when one wishes to perform calculations concerning the process variable. Further, if the calculations are to be performed in a digital computer, it is also necessary to convert the linearized analog quantity to a digital quantity, for example, a binary number or word before the calculations can be carried out.

The present invention solves both of the problems above and with apparatus already largely available in many digital computers. It requires a memory, which may be a cyclical storage medium such as a drum, but which is not necessarily limited to a cyclical storage medium. The values of the process variable corresponding to fixed increments of an analog quantity which represents the variable, are stored in the memory. A generator produces a reference analog quantity, the value of which is a linear function of time. This quantity starts at a reference time $t_0$. The reference analog quantity is compared with the analog quantity representative of the variable being measured. The time $\Delta t$ between $t_0$ and the time at which the two quantities compared are equal is indicative of the address in the memory which contains the value of the variable corresponding to the analog quantity.

The invention is described in greater detail below and is illustrated in the following drawings of which:

Figures 1, 2:
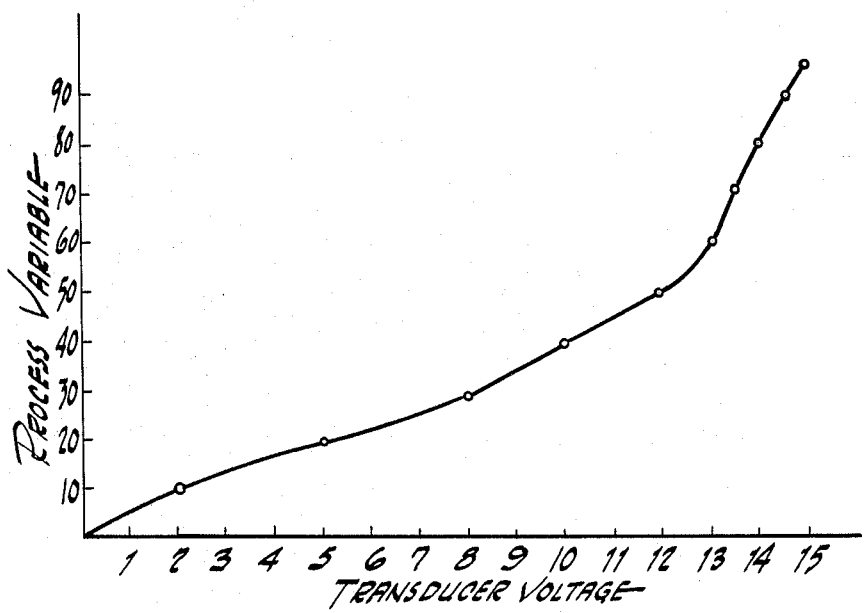
FIG. 1 is a graph of a process variable being measured versus a transducer voltage indicative of the variable.
FIG. 2 is a table relating the transducer voltage to the process variable.

FIG. 1 should be referred to first. It is a plot of a process variable such as temperature, water volume, gas pressure, or any other variable against a transducer voltage indicative of the variable. It is clear that the relationship between the transducer voltage and the process variable is non-linear. This non-linear relationship is also shown in the table of FIG. 2.

As already mentioned in the introduction, in the event that an industrial process is controlled by a digital computer, it is necessary to apply digital, for example, binary information to the computer indicative of the process variable measured by the transducer voltage. Since the transducer voltage is non-linearly related to the process variable, it may be necessary to linearize the transducer voltage prior to the time it can be converted to a binary word.

Figure 3:
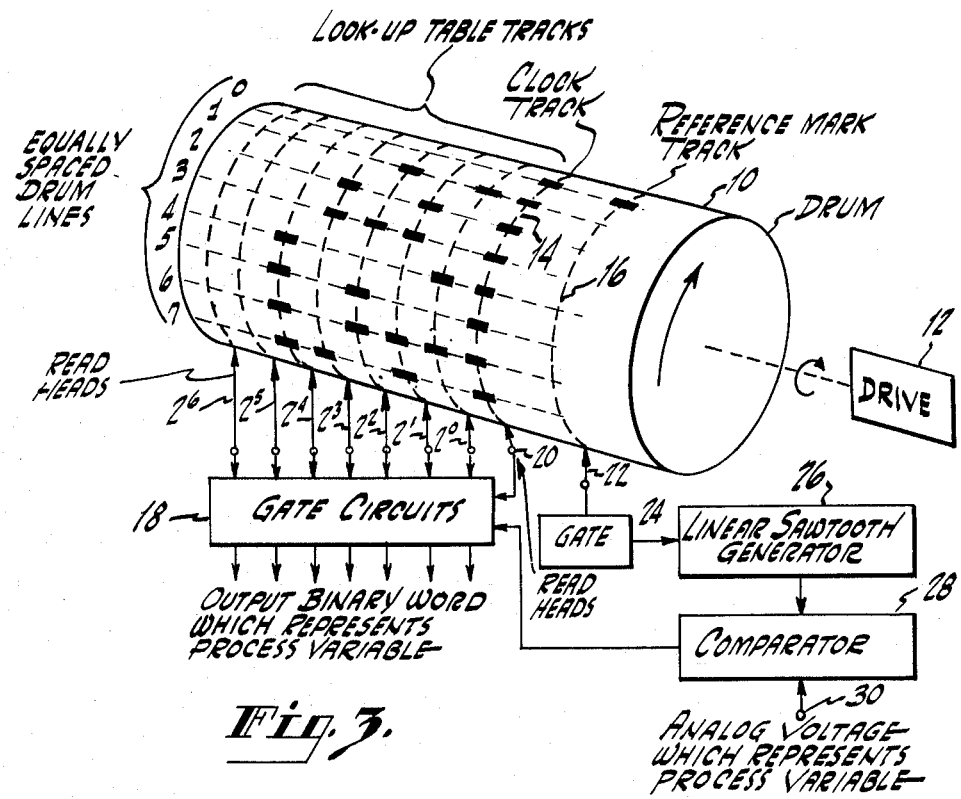
FIG. 3 is a block circuit diagram of a preferred form of the present invention.

FIG. 3 illustrates the circuit of the present invention which solves the problem above and does so with a minimum of equipment other than is already available in a typical industrial computer. The circuit includes a cyclical recording medium such as a magnetic drum 10. The drum is driven at a uniform speed by the drive means 12. A look-up table is recorded on the drum which is indicative of the process variable represented by the transducer voltage. The number of tracks required by the look-up table depends upon the precision desired for the binary output word which is produced. In the example chosen for illustration, there are seven tracks in the table.

The drum 10 also includes a clock track 14. This track has a binary bit recorded on each line of the track. A recorded binary bit is represented in the drawing as a black mark.

The drum 10 also includes a reference or index mark track 16. This track has a binary bit recorded only on the "zero" line of the drum.

Only the read heads of the drum are illustrated, however, it is to be understood that write heads are present. There are seven read heads for reading the information present in the look-up table. These are legended $2^0$ through $2^6$ inclusive as each read head corresponds to a track for bits of different rank in the look-up table. These seven read heads are connected to gate circuits 18. The read head 20 for the clock track is also connected to gate circuit 18.

The read head 22 for the reference mark track is connected to gate circuit 24. The gate circuit 24 is, in turn, connected to a linear sawtooth generator 26 and the latter applies the sawtooth it generates to comparator 28. The second input to the comparator is the analog voltage which represents the process variable. It is applied to input terminal 30.

Returning to the look-up table, the successive lines of the table record the process variable which corresponds to successive fixed increments of the transducer voltage. For the sake of illustration, the fixed increments are taken as one volt. Thus, on line 0, which corresponds to zero volts, the binary word 0000000 is recorded. The process variable 5 corresponds to the transducer voltage one volt. Accordingly, the binary word 0000101 (5 units) is recorded on line 1 of the drum. The process variable 10 corresponds to the transducer voltage two volts. Accordingly, the binary word 0001010 (10 units) is recorded on line 2 and so on.

In operation, an analog voltage which represents the process variable is applied to the comparator 28. In the event that this voltage varies relatively slowly with respect to the speed at which the drum rotates, the voltage may be directly applied to the comparator. Alternatively, in the event that the analog voltage variations are very rapid, the voltage may be gated out during a short time interval and temporarily stored in a storage device such as a capacitor or the like. The stored voltage may then be applied to terminal 30 for a longer time interval.

When the reference mark on the reference track 16 moves under the read head 22, a pulse is applied through the gate circuit 24 to the linear sawtooth generator 26. The latter starts generating a sawtooth which increases linearly as a function of time and applies it to the comparator 28. The rate of linear increase is such that $\Delta v$, the change in sawtooth voltage, which occurs in $\Delta t$, the time required by the drum to rotate through the space between two lines on the drum, is equal to the fixed increments of the transducer voltage at which the values of the process variable are recorded on the drum. In the present example, $\Delta v$ is one volt.

During the time the linear sawtooth is increasing, the drum continues to rotate and the successive, equally spaced drum lines pass successively under the read heads $2^0$–$2^6$. When the linear sawtooth voltage generated at 26 becomes equal in amplitude to the analog voltage applied to terminal 30, the comparator 28 produces an output pulse. This pulse places the gate circuits 18 in condition to conduct in a manner to be explained in more detail shortly. If the read heads are then under a line on the drum, the clock pulse on that line enables the gate circuits 18 and that line is read out. If not, the next clock pulse which passes head 20 enables the gate circuits 18 and the binary word appearing on the line that this enabling clock pulse is at is read out.

A numerical illustration may help the reader better to understand the invention. Assume that the analog voltage is three volts. At a time $t_0$, the time the linear sawtooth generator starts, the read heads are all under line zero. At time $t_3$, the time required for the drum to rotate from line zero to line three, the linear sawtooth produced by generator 26 has an amplitude of three votes. As this is equal to the analog voltage, the comparator produces an output pulse. At the same time, the clock pulse on line 3 is applied to the gate circuits 18. Thus, the gate circuits 18 are all enabled and the binary word appearing on line 3 passes the gate circuits. This binary word is 0001110, the binary equivalent of 14.

The gate 24, the linear sawtooth generator 26, and the comparator 28 are all well-known circuits. The gate 24, for example, may merely be a biased amplifier. The linear sawtooth generator may be any standard, fairly precise circuit such as a bootstrap generator. The generator 28 may be a form of differential amplifier which receives the sawtooth wave at one input terminal and the analog signal at its other input terminal. This circuit produces an output in response to equality of the two inputs. Other types of comparators commonly used in radar or other applications are also suitable. The gate circuits 18 may take any one of a number of different forms, however, one specific form is shown in FIG. 4.

Figure 4:
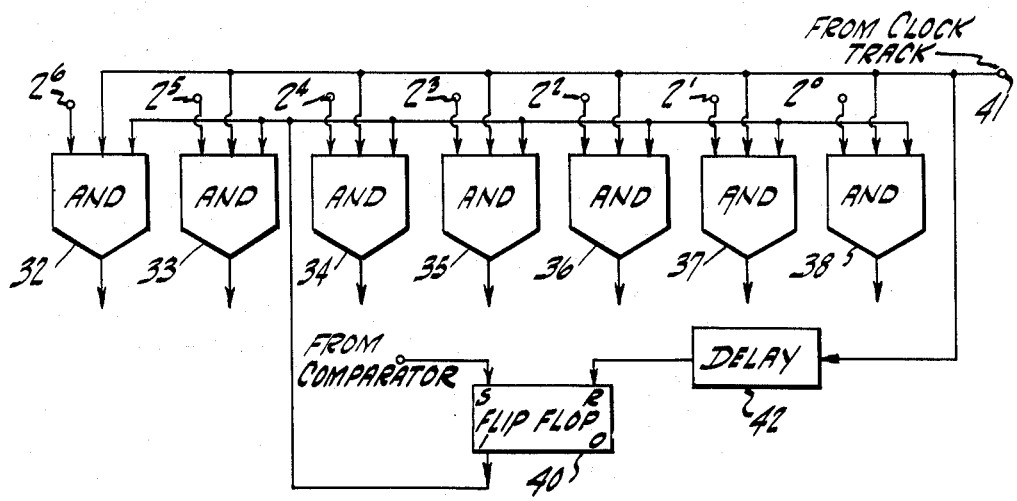
FIG. 4 is a more detailed showing of certain gate circuits of FIG. 3.

The circuit of FIG. 4 includes seven "and" gates 32–38, inclusive. Each "and" gate receives an input from a different one of the seven read heads. Each "and" gate also receives an input from the clock track. The third input to each "and" gate is from the one output terminal of flip-flop 40. This flp-flop produces a "one" output at its one terminal when set and a "zero" output at its one terminal when reset. The set signal for the flip-flop is the signal output from comparator 28. The reset signal for the flip-flop 40 is the clock signal delayed an interval sufficient for the "and" gates to produce an output.

In operation, when the linear sawtooth voltage is equal to the analog voltage, the comparator sets flip-flop 40. If, at that time, the reading heads are directly under a drum line, a clock pulse on that drum line is applied to input terminal 41 and, all of the "and" gates are enabled. If, on the other hand, a drum line is not directly under the reading heads, the "and" gates remain primed by the one output of the flip-flop until the next drum line appears under the reading heads. At that time a pulse from the clock track is applied to terminal 41 and all of the "and" gates are enabled. Flip-flop 40 is reset immediately thereafter by the delayed clock pulse applied through the delay line 42 to the reset terminal of the flip-flop. When the flip-flop is reset, all of the "and" gates become disabled. The flip-flop becomes set again the next time there is an output from the comparator. To prevent a clock pulse from prematurely resetting flip-flop 40, the comparator signal may be stretched (made slightly longer than the delay interval 42) and of sufficient amplitude to override the resetting action of the clock pulse. This prevents a clock pulse which occurs immediately prior to a comparator pulse from resetting the flip-flop before the "and" gates are "read out."

In the embodiment of the invention described, the memory employed is a drum. Other types of memories may be employed. For example, a magnetic core memory may be employed. When employing a core memory, the address in the memory at which the correct value of the process variable may be found is obtained in the following way. A count is started beginning at time $t_0$ and ending at the time that the analog voltage is equal to the sawtooth voltage. The count may be terminated, for example, by the output of the comparator. This count is then converted to the memory address which stores the appropriate value of the process variable. In principle, this method of obtaining the address is the same as the one previously described. In both cases, the time between which the sawtooth starts and the time at which the sawtooth voltage equals the analog voltage, is the parameter which is sensed for determining the memory address. In the embodiment of the invention illustrated, this time determines the line of the drum which is read out. In the embodiment of the invention discussed above, this time is converted to a count which indicates the memory address.

The drum system described has a number of important advantages:

(1) Any functional relationship between a process variable and a transducer voltage representing that variable can easily be handled.

(2) The entire look up table can be recorded on the drum and the table can easily be changed, if required.

(3) The only hardware require for conversion and the linearization in addition to the drum already existing in a computer is a simple comparator, sawtooth generator, and some relatively inexpensive gates. The cost saving over prior ways of solving the same problem may represent several thousands of dollars per computer system.

(4) A single drum can handle several different types of linearization. This may require the storage of more than one table on the drum. The circuits are similar to those discussed above in which only a single table is shown for purposes of illustrating the invention.

What is claimed is:

1. In combination, a cyclical recording medium which is rotatable at a fixed speed, said medium having recorded on successive, equally spaced lines thereof the values, in binary form, of a variable represented by successive equal increments of an analog quantity, where said analog quantity bears a non-linear relationship to said variable; means for producing a reference analog quantity the value of which is a linear function of time and which starts at a time corresponding to the time when the first line on said medium passes a reference position; and means for comparing said reference analog quantity with an analog quantity representative of said variable and, when the two analog quantities bear a predetermined relationship, reading the information then appearing on the medium at said reference position.

2. In combination, a cyclical recording medium which is rotatable at a fixed speed, said medium having recorded on successive, equally spaced lines thereof the values, in binary form, of a variable represented by successive equal increments of an analog quantity, where said analog quantity bears a non-linear relationship to said variable; means for producing a reference analog quantity the value of which is a linear function of time and which starts at a time corresponding to the time when the first line on said medium passes a reference position; and means for comparing said reference analog quantity with an analog quantity representative of said variable and, when the two analog quantities are equal, reading the information then appearing on the medium at said reference position.

3. In combination, a drum which is rotatable at a fixed speed, said drum having recorded on successive, equally spaced lines thereof the values, in binary form, of a variable represented by successive equal increments $\Delta v$ of an analog voltage, where said voltage bears a non-linear relationship to said variable; means for producing a linearly increasing sawtooth wave which starts at a time corresponding to the time when the first line on said drum passes a reference position, and which changes an amount $\Delta v$ during the time interval required for two adjacent lines on said drum to pass said reference position; and means for comparing said sawtooth wave with an analog voltage representative of said variable and, when the sawtooth wave voltage equals the analog voltage, reading the information then appearing on a line of the drum.

4. In combination, a memory; means for storing in said memory a table the successive lines of which record the values of a variable which correspond to successive equal increments of an analog quantity non-linearly related to the variable; and means receptive of an analog quantity for deriving therefrom the address in said memory of the variable in said table corresponding to said quantity.

5. In combination, a memory; means for storing in said memory a table of the values of the variable; means for producing a linearly increasing quantity starting at time $t_0$; means for comparing the value of this quantity with that of an analog quantity which represents a value of said variable and which bears a non-linear relationship to said variable; and means responsive to the time $\Delta t$ between $t_0$ and the time at which there is a predetermined relationship between the linearly increasing quantity and the analog quantity for addressing the location in said memory having the value of said variable corresponding to said analog quantity.

6. In combination, a memory; means for storing in said memory a table of the values of a variable; means for producing a linearly increasing quantity starting at time $t_0$; means for comparing the value of this quantity with that of an analog quantity which represents a value of said variable and which bears a non-linear relationship to said variable for producing an output when the two quantities are equal; and means responsive to the time $\Delta t$ between $t_0$ and the time at which said output is produced for addressing the location in said memory having the value of said variable corresponding to said analog quantity.

7. In the combination as set forth in claim 6, said memory comprising a cyclical memory.

8. In combination, a memory; means for storing in said memory a table of the values of a process variable which varies non-linearly with a voltage which measures said variable; means for producing a linearly increasing saw tooth voltage starting at time $t_0$; means for comparing the value of this voltage with an analog voltage which represents a given value of said variable and for producing an output when the two voltages compared are equal; and means responsive to the time $\Delta t$ between $t_0$ and the time at which the two voltages compared are equal for addressing the location in said memory having a value of said variable corresponding to said analog voltage.

9. In combination as set forth in claim 8, said memory comprising a magnetic drum.

References Cited by the Examiner

UNITED STATES PATENTS

| | | | |
|---|---|---|---|
| 2,597,866 | 5/1952 | Gridley | 340—347 |
| 2,616,965 | 11/1952 | Hoeppner | 340—347 |
| 2,870,436 | 1/1959 | Kuder | 340—347 |
| 2,984,831 | 5/1961 | Oken et al. | 340—347 |
| 3,052,880 | 9/1962 | Young et al. | 340—347 |

MALCOLM A. MORRISON, *Primary Examiner.*